US010063352B2

(12) United States Patent
Liu et al.

(10) Patent No.: US 10,063,352 B2
(45) Date of Patent: Aug. 28, 2018

(54) HARQ/CSI ACK FEEDBACK METHOD OVER UNLICENSED CARRIER

(71) Applicant: Telefonaktiebolaget L M Ericsson (publ), Stockholm (SE)

(72) Inventors: Jinhua Liu, Beijing (CN); Shaohua Li, Beijing (CN); Xinghua Song, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 46 days.

(21) Appl. No.: 15/006,166

(22) Filed: Jan. 26, 2016

(65) Prior Publication Data

US 2016/0226629 A1 Aug. 4, 2016

(51) Int. Cl.
*H04L 1/18* (2006.01)
*H04L 5/00* (2006.01)
*H04L 1/16* (2006.01)

(52) U.S. Cl.
CPC ............. *H04L 1/1861* (2013.01); *H04L 5/00* (2013.01); *H04L 1/1671* (2013.01)

(58) Field of Classification Search
CPC .................................................... H04L 1/1861
See application file for complete search history.

(56) References Cited

U.S. PATENT DOCUMENTS 9,674,845 B2 * 6/2017 Chen .................... H04W 72/082
2011/0038271 A1 * 2/2011 Shin .................... H04W 52/146
370/252

2011/0128942 A1 * 6/2011 Kim .................... H04B 7/0639
370/336

(Continued)

FOREIGN PATENT DOCUMENTS

EP 2385647 A2 11/2011
EP 2639984 A2 9/2013

(Continued)

OTHER PUBLICATIONS

International Search Report and Written Opinion for International Patent Application No. PCT/IB2016/050441, dated Sep. 26, 2016, 23 pages.

(Continued)

*Primary Examiner* — Parth Patel
(74) *Attorney, Agent, or Firm* — Withrow & Terranova, PLLC

(57) ABSTRACT

Systems and methods relating to the use of an unlicensed Component Carrier (CC) for Hybrid Automatic Repeat Request (HARQ) and/or Channel State Information (CSI) feedback for a downlink CC or a downlink CC group are disclosed. In some embodiments, a method of operation of a wireless device in a cellular communications network comprises selecting, from a plurality of uplink CCs configured for the wireless device for HARQ and/or CSI feedback of a downlink CC or a downlink CC group, an uplink CC for HARQ and/or CSI feedback of the downlink CC or the downlink CC group based on channel availability. The method further comprises transmitting HARQ and/or CSI feedback of the downlink CC or the downlink CC group over the uplink CC selected from the plurality of uplink CCs configured for the wireless device.

25 Claims, 12 Drawing Sheets

(56) References Cited

U.S. PATENT DOCUMENTS

| | | | | | |
|---|---|---|---|---|---|
| 2011/0310833 | A1* | 12/2011 | Lee | H04L 1/1829 | 370/329 |
| 2013/0114547 | A1* | 5/2013 | Li | H04W 72/042 | 370/329 |
| 2013/0114575 | A1* | 5/2013 | Fu | H04L 5/0053 | 370/336 |
| 2013/0121299 | A1* | 5/2013 | Kim | H04L 5/001 | 370/329 |
| 2013/0308464 | A1* | 11/2013 | Park | H04W 72/0406 | 370/241 |
| 2013/0336156 | A1* | 12/2013 | Wei | H04L 5/001 | 370/252 |
| 2013/0336175 | A1* | 12/2013 | Um | H04L 5/14 | 370/280 |
| 2014/0036818 | A1* | 2/2014 | Koskela | H04W 72/042 | 370/329 |
| 2014/0056245 | A1* | 2/2014 | Qin | H04W 36/0088 | 370/329 |
| 2014/0086078 | A1* | 3/2014 | Malladi | H04W 72/042 | 370/252 |
| 2014/0119339 | A1* | 5/2014 | Yang | H04L 5/001 | 370/331 |
| 2014/0308954 | A1* | 10/2014 | Wang | H04W 36/165 | 455/436 |
| 2014/0362780 | A1* | 12/2014 | Malladi | H04W 16/14 | 370/329 |
| 2015/0009943 | A1* | 1/2015 | Zhang | H04W 72/04 | 370/329 |
| 2015/0043391 | A1* | 2/2015 | Yin | H04L 5/0092 | 370/280 |
| 2015/0049709 | A1* | 2/2015 | Damnjanovic | H04L 5/0055 | 370/329 |
| 2015/0098347 | A1* | 4/2015 | Guo | H04W 72/0413 | 370/252 |
| 2015/0139101 | A1* | 5/2015 | Guo | H04L 5/0035 | 370/329 |
| 2016/0095101 | A1* | 3/2016 | Ye | H04L 1/1812 | 370/329 |
| 2016/0099799 | A1* | 4/2016 | Bashar | H04W 72/02 | 370/280 |
| 2016/0227455 | A1* | 8/2016 | Lei | H04L 1/00 | |
| 2016/0278118 | A1* | 9/2016 | Yerramalli | H04L 5/001 | |
| 2016/0309491 | A1* | 10/2016 | Dai | H04W 72/04 | |
| 2017/0041950 | A1* | 2/2017 | Wang | H04W 76/02 | |
| 2017/0094528 | A1* | 3/2017 | Takeda | H04W 16/14 | |
| 2017/0094529 | A1* | 3/2017 | Clegg | H04W 16/16 | |

FOREIGN PATENT DOCUMENTS

| | | |
|---|---|---|
| WO | 2012074343 A2 | 6/2012 |
| WO | 2012078565 A1 | 6/2012 |
| WO | 2012106843 A1 | 8/2012 |
| WO | 2013006988 A1 | 1/2013 |
| WO | 2013120253 A1 | 8/2013 |

OTHER PUBLICATIONS

International Search Report and Written Opinion for International Patent Application No. PCT/CN2015/071932, dated Oct. 28, 2015, 8 pages.

International Preliminary Report on Patentability for International Patent Application No. PCT/CN2015/071932, dated Aug. 10, 2017, 6 pages.

International Preliminary Report on Patentability for International Patent Application No. PCT/IB2016/050441, dated Aug. 10, 2017, 17 pages.

* cited by examiner

HARQ/CSI ACK FEEDBACK METHOD OVER UNLICENSED CARRIER

RELATED APPLICATIONS

This application claims the benefit of PCT patent application serial number PCT/CN2015/071932, filed Jan. 30, 2015, the disclosure of which is hereby incorporated herein by reference in its entirety.

TECHNICAL FIELD

Embodiments of the present disclosure relate to the field of wireless communication; and more specifically, to Hybrid Automatic Repeat Request (HARQ)/Channel State Information (CSI) Acknowledgement (ACK) feedback over unlicensed carriers.

BACKGROUND

I. Long Term Evolution (LTE)

LTE uses Orthogonal Frequency Division Multiplexing (OFDM) in the downlink and Discrete Fourier Transform (DFT) spread OFDM (DFT-spread OFDM), which is also referred to as Single Carrier Frequency Division Multiple Access (SC-FDMA), in the uplink. The basic LTE downlink physical resource can thus be seen as a time-frequency grid as illustrated in FIG. 1, where each resource element corresponds to one OFDM subcarrier during one OFDM symbol interval. The uplink subframe has the same subcarrier spacing as the downlink and the same number of SC-FDMA symbols in the time domain as OFDM symbols in the downlink.

In the time domain, LTE downlink transmissions are organized into radio frames of 10 milliseconds (ms), each radio frame consisting of ten equally-sized subframes of length $T_{SUBFRAME}=1$ ms as shown in FIG. 2. For normal cyclic prefix, one subframe consists of 14 OFDM symbols. The duration of each symbol is approximately 71.4 microseconds (μs).

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in the time direction (1.0 ms) is known as a resource block pair. Resource blocks are numbered in the frequency domain, starting with 0 from one end of the system bandwidth.

Downlink transmissions are dynamically scheduled, i.e., in each subframe the base station transmits control information about which terminals data is transmitted to and upon which resource blocks the data is transmitted, in the current downlink subframe. This control signaling is typically transmitted in the first 1, 2, or 3 OFDM symbols in each subframe and the number n=1, 2, or 3 is known as the Control Format Indicator (CFI). The downlink subframe also contains common reference symbols, which are known to the receiver and used for coherent demodulation of, e.g., the control information. A downlink system with CFI=3 OFDM symbols as control is illustrated in FIG. 3.

From LTE Release 11 (Rel-11) onwards, the above described resource assignments can also be scheduled on the enhanced Physical Downlink Control Channel (EPDCCH). For Release 8 (Rel-8) to Release 10 (Rel-10), only the Physical Downlink Control Channel (PDCCH) is available. The reference symbols shown in FIG. 3 are the Cell specific Reference Symbols (CRSs) and are used to support multiple functions including fine time and frequency synchronization and channel estimation for certain transmission modes.

A. PDCCH and EPDCCH

The PDCCH/EPDCCH is used to carry Downlink Control Information (DCI) such as scheduling decisions and power control commands. More specifically, the DCI includes:

Downlink scheduling assignments, including Physical Downlink Shared Channel (PDSCH) resource indication, transport format, Hybrid Automatic Repeat Request (HARQ) information, and control information related to spatial multiplexing (if applicable). A downlink scheduling assignment also includes a command for power control of the Physical Uplink Control Channel (PUCCH) used for transmission of HARQ Acknowledgements (ACKs) in response to downlink scheduling assignments.

Uplink scheduling grants, including Physical Uplink Shared Channel (PUSCH) resource indication, transport format, and HARQ-related information. An uplink scheduling grant also includes a command for power control of the PUSCH.

Power control commands for a set of terminals as a complement to the commands included in the scheduling assignments/grants.

One PDCCH/EPDCCH carries one DCI message containing one of the groups of information listed above. As multiple terminals can be scheduled simultaneously, and each terminal can be scheduled on both downlink and uplink simultaneously, there must be a possibility to transmit multiple scheduling messages within each subframe. Each scheduling message is transmitted on separate PDCCH/EPDCCH resources, and consequently there are typically multiple simultaneous PDCCH/EPDCCH transmissions within each subframe in each cell. Furthermore, to support different radio channel conditions, link adaptation can be used, where the code rate of the (E)PDCCH is selected by adapting the resource usage for the (E)PDCCH, to match the radio channel conditions.

B. Carrier Aggregation (CA)

The LTE Rel-10 standard supports bandwidths larger than 20 megahertz (MHz). One important aspect of LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular for early LTE Rel-10 deployments, it can be expected that there will be a smaller number of LTE Rel-10-capable terminals compared to many LTE legacy terminals. Therefore, it is necessary to assure an efficient use of a wide carrier also for legacy terminals, i.e. that it is possible to implement carriers where legacy terminals can be scheduled in all parts of the wideband LTE Rel-10 carrier. The straightforward way to obtain this would be by means of CA. CA implies that an LTE Rel-10 terminal can receive multiple CCs, where the CCs have, or at least the possibility to have, the same structure as an LTE Rel-8 carrier. CA is illustrated in FIG. 4. A CA-capable User Equipment device (UE) is assigned a Primary Cell (PCell) which is always activated, and one or more Secondary Cells (SCells) which may be activated or deactivated dynamically.

The number of aggregated CCs as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a terminal: A terminal may for example support more downlink CCs than uplink CCs, even though the cell is configured with the same number of uplink and downlink CCs.

In addition, a key feature of CA is the ability to perform cross-carrier scheduling. This mechanism allows a (E)PDCCH on one CC to schedule data transmissions on another CC by means of a 3-bit Carrier Indicator Field (CIF) inserted at the beginning of the (E)PDCCH messages. For data transmissions on a given CC, a UE expects to receive scheduling messages on the (E)PDCCH on just one CC—either the same CC, or a different CC via cross-carrier scheduling; this mapping from (E)PDCCH to PDSCH is also configured semi-statically. Note that cross-subframe cross-carrier scheduling of PDSCH is not supported in Rel-11 CA, i.e., the (E)PDCCH grant in a particular subframe applies to a PDSCH allocation in that same Transmit Time Interval (TTI).

C. PUCCH

Uplink Control Information (UCI), which is carried over PUCCH, is used to carry the HARQ-ACK/Negative Acknowledgement (NACK), Channel State Information (CSI), and Scheduling Request (SR) for a UE. It is transmitted using side Physical Resource Blocks (PRBs) in the uplink. FIG. 5 illustrates non-Format 3 PUCCH region with 6 PRBs and Format 3 PUCCH region with 4 PRBs, 3 and 2 PRBs in each side of the system bandwidth respectively. One PUCCH is transmitted over one PRB; in order to improve the diversity with PUCCH over only one PRB, the first half PRB is put one side and the second half PRB is put the opposite side.

UCI has a lot of formats, Format 1, 1a/b, 2, 2a/b and 3, for different purposes. Within these formats, PUCCH Format 3 is designed to convey large ACK/NACK payloads in case of CA with up to 5 CCs. PUCCH Format 3 is not based on Zadoff-Chu sequences and is more similar to PUSCH transmissions. Orthogonal cover sequences are applied to the SC-FDMA symbols used for ACK/NACK data. These sequences are DFT sequences of length 5, allowing multiplexing of up to 5 Format 3 transmissions in the same resource block. PUCCH Format 3 supports transmission of 48 coded bits. The actual number of bits of ACK/NACK feedback is determined by the number of configured CCs, the configured transmission modes on each of them, and, in Time Division Duplexing (TDD), the ACK/NACK bundling window size. For Frequency Division Duplexing (FDD), a maximum payload of 10 ACK/NACK bits is supported, covering up to five CCs configured for Multiple Input Multiple Output (MIMO) transmission (i.e., two ACK/NACK bits per CC). For TDD, PUCCH Format 3 supports an ACK/NACK payload size of up to 20 bits. The PUCCH resource to be used for Format 3 is signaled explicitly to the UE. A set of four resources is configured by Radio Resource Control (RRC) signaling, of which one resource is then indicated dynamically for each ACK/NACK occasion using an indicator transmitted in the Transmitter Power Control (TPC) field of the PDCCH corresponding to PDSCH on the Secondary CCs (SCCs). All SCC PDCCH assignments in a given subframe indicate the same value. If transmit diversity is used for PUCCH Format 3, the RRC signaling configures four pairs of PUCCH resources, and the PDCCH assigning resources for the SCC PDSCH indicates one of these pairs to be used by the two antenna ports.

II. Wireless Local Area Network (WLAN)

In typical deployments of WLAN, Carrier Sense Multiple Access with Collision Avoidance (CSMA/CA) is used for medium access. The channel is sensed to perform a Clear Channel Assessment (CCA), and a transmission is initiated only if the channel is declared as Idle. In case the channel is declared as Busy, the transmission is essentially deferred until the channel is deemed to be Idle. When the range of several Access Points (APs) using the same frequency overlap, transmissions related to one AP might be deferred in case a transmission on the same frequency to or from another AP which is within range can be detected. If several APs are within range, they will have to share the channel in time, and the throughput for the individual APs may be severely degraded.

III. Licensed Assisted Access (LAA) to Unlicensed Spectrum Using LTE

Up to now, the spectrum used by LTE is dedicated to LTE (i.e., is licensed spectrum). This has the advantage that the LTE system does not need to care about the coexistence issue and the spectrum efficiency can be maximized. However, the spectrum allocated to LTE is limited and, as such, cannot meet the ever increasing demand for larger throughput from applications/services. Therefore, $3^{rd}$ Generation Partnership Project (3GPP) is conducting work related to extending LTE to exploit unlicensed spectrum in addition to licensed spectrum. Unlicensed spectrum can, by definition, be simultaneously used by multiple different technologies. Therefore, LTE needs to consider the coexistence issue with other systems such as IEEE 802.11 (Wi-Fi). Operating LTE in the same manner in unlicensed spectrum as in licensed spectrum can seriously degrade the performance of Wi-Fi as Wi-Fi will not transmit once it detects the channel is occupied.

Furthermore, one way to utilize the unlicensed spectrum reliably is to transmit essential control signals and channels on a licensed carrier. That is, as shown in FIG. 6, a UE is connected to a PCell in the licensed band and one or more SCells in the unlicensed band. As used herein, an SCell in unlicensed spectrum is denoted as an LAA SCell. In the case of cross-carrier scheduling, PDSCH and PUSCH grants for the LAA SCell are transmitted on the PCell.

IV. Problem

In 3GPP, a work item is being started to specify the 32-carrier capability for LTE in order to make use of licensed as well as plenty of unlicensed carriers. As the number of carriers increases, it may not be sufficient to only carry the HARQ feedback over the licensed carriers when there are not enough licensed carriers. In practice, the downlink traffic is expected to be much heavier than uplink, and it is expected that HARQ and/or CSI feedback for downlink transmission shall be well specified.

A. Investigation to Further Enhancement of CA (FeCA)

The reason why up to 32 CCs is preferred in FeCA is that it is also attractive to make use of unlicensed carriers which are mainly used by Wi-Fi currently. Within 32 carriers, there can be both licensed carriers and unlicensed carriers.

As for one operator, it is not likely that it may own many licensed carriers. For instance, for an LTE operator, it may only own one licensed carrier in uplink and one or two licensed carriers in downlink. In such case, it may be impossible to put all feedback messages for 32 downlink carriers over the single primary uplink carrier due to resource limitation. Hence, there is necessity to put the feedback message over the SCCs in uplink.

B. Using Unlicensed Carrier for LTE

According to the regulation policies of many countries, it is widely thought that carrier sensing (i.e., LBT) shall be introduced for LTE over unlicensed carrier. The LTE enhanced or evolved Node B (eNB) can only transmit data over an unlicensed carrier when it determines that the channel is available after carrier sensing. The eNB is not allowed to transmit data when it is determined that the channel is not available.

When the number of the aggregated downlink CCs increases from 5 to 32, the HARQ feedback and/or the CSI feedback increases proportionally. When an operator does not own enough licensed uplink CCs, one approach that can be considered is carrying HARQ feedback and/or CSI over the unlicensed CC. However, the availability of an unlicensed CC for the HARQ and/or CSI feedback is not predictable at the time when the downlink transmission is processed and, as such, there is a need for systems and methods for providing HARQ and/or CSI feedback over an unlicensed CC.

SUMMARY

Embodiments relating to the use of an unlicensed Component Carrier (CC) for Hybrid Automatic Repeat Request (HARQ) and/or Channel State Information (CSI) feedback for a downlink CC or a downlink CC group are disclosed. In some embodiments, a method of operation of a wireless device in a cellular communications network comprises selecting, from a plurality of uplink CCs configured for the wireless device for HARQ and/or CSI feedback of a downlink CC or a downlink CC group, an uplink CC for HARQ and/or CSI feedback of the downlink CC or the downlink CC group based on channel availability. The method further comprises transmitting HARQ and/or CSI feedback of the downlink CC or the downlink CC group over the uplink CC selected from the plurality of uplink CCs configured for the wireless device.

In some embodiments, at least one of the plurality of uplink CCs configured for the wireless device for HARQ and/or CSI feedback of the downlink CC or the downlink CC group is in an unlicensed frequency spectrum.

In some embodiments, the plurality of uplink CCs configured for the wireless device for HARQ and/or CSI feedback of the downlink CC or the downlink CC group comprise a first uplink CC that is in an unlicensed frequency band and one or more additional uplink CCs. Further, selecting the uplink CC for HARQ and/or CSI feedback of the downlink CC or the downlink CC group comprises selecting the first uplink CC as the uplink CC for HARQ and/or CSI feedback of the downlink CC or the downlink CC group if a respective channel over which the first uplink CC is transmitted is available. Selecting the uplink CC further comprises, if the respective channel over which the first uplink CC is transmitted is unavailable, selecting one of the one or more additional uplink CCs as the uplink CC for HARQ and/or CSI feedback of the downlink CC or the downlink CC group.

In some embodiments, at least one of the one or more additional uplink CCs is in a licensed frequency spectrum. In some embodiments, at least one of the one or more additional uplink CCs is in an unlicensed frequency spectrum.

In some embodiments, the method further comprises receiving, from a base station of the cellular communications network, a configuration of the downlink CC or the downlink CC group for the wireless device, the configuration comprising a configuration of the first uplink CC for HARQ and/or CSI feedback of the downlink CC or the downlink CC group. The method further comprises receiving, from the base station, a configuration of the one or more additional uplink CCs and a feedback resource on each of the one or more additional uplink CCs. Further, transmitting the HARQ and/or CSI feedback comprises transmitting the HARQ and/or CSI feedback over the uplink CC using the feedback resource configured for the uplink CC.

Further, in some embodiments, the one or more additional uplink CCs comprise a plurality of additional uplink CCs, and receiving the configuration of the one or more additional uplink CCs and the feedback resource on each of the one or more additional uplink CCs comprises receiving a single feedback resource indicator for at least one of the plurality of additional uplink CCs.

In other embodiments, the one or more additional uplink CCs comprise a plurality of additional uplink CCs, and receiving the configuration of the one or more additional uplink CCs and the feedback resource on each of the one or more additional uplink CCs comprises receiving a separate feedback resource indicator for each of the plurality of additional uplink CCs.

In some embodiments, at least one of the one or more additional uplink CCs is also configured for HARQ and/or CSI feedback for another downlink CC or another downlink CC group, and the frequency resource configured for the at least one of the one or more additional uplink CCs is orthogonal, in the time/frequency domain, to a frequency resource configured for the at least one of the one or more additional uplink CCs for HARQ and/or CSI feedback for the other downlink CC or the other downlink CC group.

In some embodiments, selecting one of the one or more additional uplink CCs as the uplink CC for HARQ and/or CSI feedback of the downlink CC or the downlink CC group if the respective channel over which the first uplink CC is transmitted is unavailable comprises selecting one of the one or more additional uplink CCs as the uplink CC for HARQ and/or CSI feedback of the downlink CC or the downlink CC group according to a predefined priority order of the one or more additional uplink CCs. Further, in some embodiments, the one or more additional uplink CCs comprise a CC in a licensed frequency band, and the CC in the licensed frequency band is assigned a lowest priority in the predefined priority order of the one or more additional uplink CCs.

In some embodiments, at least one of the one or more additional uplink CCs is in an unlicensed frequency spectrum, and selecting the uplink CC for HARQ and/or CSI feedback of the downlink CC or the downlink CC group further comprises monitoring channel availability for the first uplink CC and the at least one of the one or more additional uplink CCs.

In some embodiments, at least one of the one or more additional uplink CCs is in an unlicensed frequency spectrum, and selecting the uplink CC for HARQ and/or CSI feedback of the downlink CC or the downlink CC group further comprises simultaneously monitoring channel availability for the first uplink CC and the at least one of the one or more additional uplink CCs.

In some embodiments, the plurality of uplink CCs configured for the wireless device for HARQ and/or CSI feedback of the downlink CC or the downlink CC group comprise a first uplink CC that is in an unlicensed frequency band and one or more additional uplink CCs, and the method further comprises determining that there is HARQ and/or CSI feedback for the downlink CC group and that the first uplink CC and the one or more additional uplink CCs for HARQ and/or CSI feedback are configured for the downlink CC group, and determining channel availability for the first uplink CC and the one or more additional uplink CCs at a time at which the HARQ and/or CSI feedback is to be transmitted.

Further, in some embodiments, selecting the uplink CC comprises selecting, from the first uplink CC and the one or more additional uplink CCs, the uplink CC for the HARQ and/or CSI feedback of the downlink CC group based on the channel availability determined for the first uplink CC and the one or more additional uplink CCs at a time at which the HARQ and/or CSI feedback is to be transmitted. Still further, transmitting the HARQ and/or CSI feedback comprises transmitting the HARQ and/or CSI feedback of the downlink CC group over the uplink CC selected from the first uplink CC and the one or more additional uplink CCs configured for the wireless device.

Embodiments of a wireless device are also disclosed. In some embodiments, a wireless device enabled to operate in a cellular communications network comprises a transceiver module comprising one or more transmitters and one or more receivers, a processing module comprising one or more processing circuits, and a memory module comprising memory storing instructions executable by the one or more processing circuits, whereby the wireless device is operable to select, from a plurality of uplink CCs configured for the wireless device for HARQ and/or CSI feedback of a downlink CC or a downlink CC group, an uplink CC for HARQ and/or CSI feedback of the downlink CC or the downlink CC group based on channel availability, and transmit, via the transceiver module, HARQ and/or CSI feedback of the downlink CC or the downlink CC group over the uplink CC selected from the plurality of uplink CCs configured for the wireless device.

Embodiments relating to a radio access node (e.g., a base station) in a cellular communications network are also disclosed. In some embodiments, a method of operation of a radio access node in a cellular communications network comprises configuring a plurality of uplink CCs for a wireless device for HARQ and/or CSI feedback of a downlink CC or a downlink CC group, and blindly decoding HARQ and/or CSI feedback of the downlink CC or the downlink CC group over at least one of the plurality of uplink CCs configured for the wireless device for HARQ and/or CSI feedback of the downlink CC or the downlink CC group.

In some embodiments, at least one of the plurality of uplink CCs configured for the wireless device for HARQ and/or CSI feedback of the downlink CC or the downlink CC group is in an unlicensed frequency spectrum.

In some embodiments, the plurality of uplink CCs configured for the wireless device for HARQ and/or CSI feedback of the downlink CC or the downlink CC group comprises a first uplink CC that is in an unlicensed frequency band and one or more additional uplink CCs. Further, in some embodiments, at least one of the one or more additional uplink CCs is in a licensed frequency spectrum. In some embodiments, at least one of the one or more additional uplink CCs is in an unlicensed frequency spectrum.

In some embodiments, configuring the plurality of uplink CCs comprises configuring a feedback resource for each of the first uplink CC and the one or more additional uplink CCs. Further, in some embodiments, the one or more additional uplink CCs comprises a plurality of additional uplink CCs, and configuring the feedback resource for each of the first uplink CC and the one or more additional uplink CCs comprises providing, to the wireless device, a single feedback resource indicator for at least one of the plurality of additional uplink CCs. In other embodiments, the one or more additional uplink CCs comprise a plurality of additional uplink CCs, and configuring the feedback resource for each of the first uplink CC and the one or more additional uplink CCs comprises providing, to the wireless device, a separate feedback resource indicator for each of the plurality of additional uplink CCs.

In some embodiments, blindly decoding HARQ and/or CSI feedback of the downlink CC or the downlink CC group over at least one of the plurality of uplink CCs comprises blindly decoding HARQ and/or CSI feedback of the downlink CC or the downlink CC group over at least one of the plurality of uplink CCs according to a predefined priority order. Further, in some embodiments, the one or more additional uplink CCs comprises a CC in a licensed frequency band, and the CC in the licensed frequency band is assigned a lowest priority in the predefined priority order.

In some embodiments, at least one of the one or more additional uplink CCs is also configured for HARQ and/or CSI feedback for another downlink CC or another downlink CC group, and a frequency resource configured for the at least one of the one or more additional uplink CCs is orthogonal, in the time/frequency domain, to a frequency resource configured for the at least one of the one or more additional uplink CCs for HARQ and/or CSI feedback for the other downlink CC or the other downlink CC group.

Embodiments of a radio access node are also disclosed. In some embodiments, a radio access node in a cellular communications network comprises a transceiver module comprising one or more wireless transceivers, a processing module comprising one or more processors, and a memory module comprising memory storing instructions executable by the one or more processors, whereby the radio access node is operable to configure a plurality of uplink CCs for a wireless device for HARQ and/or CSI feedback of a downlink CC or a downlink CC group, and blindly decode HARQ and/or CSI feedback of the downlink CC or the downlink CC group over at least one of the plurality of uplink CCs configured for the wireless device for HARQ and/or CSI feedback of the downlink CC or the downlink CC group.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
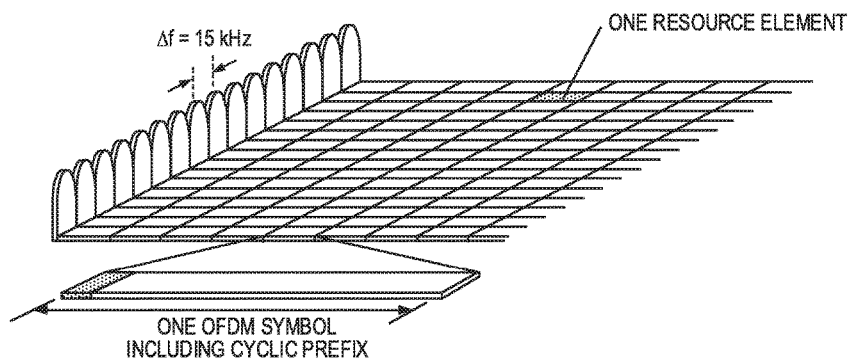
FIG. 1 is a schematic diagram of an example Orthogonal Frequency Division Multiplexing (OFDM) time/frequency domain structure in a 3$^{rd}$ Generation Partnership Project (3GPP) Long Term Evolution (LTE) network.
Figure 2:
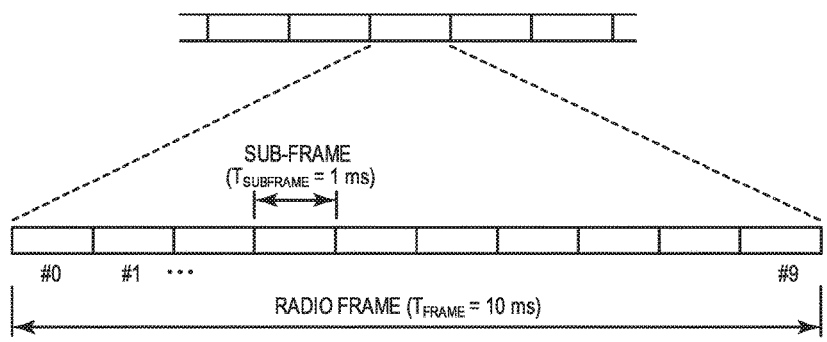
FIG. 2 is a schematic diagram of a time-domain radio frame structure in a 3GPP LTE network.
Figure 3:
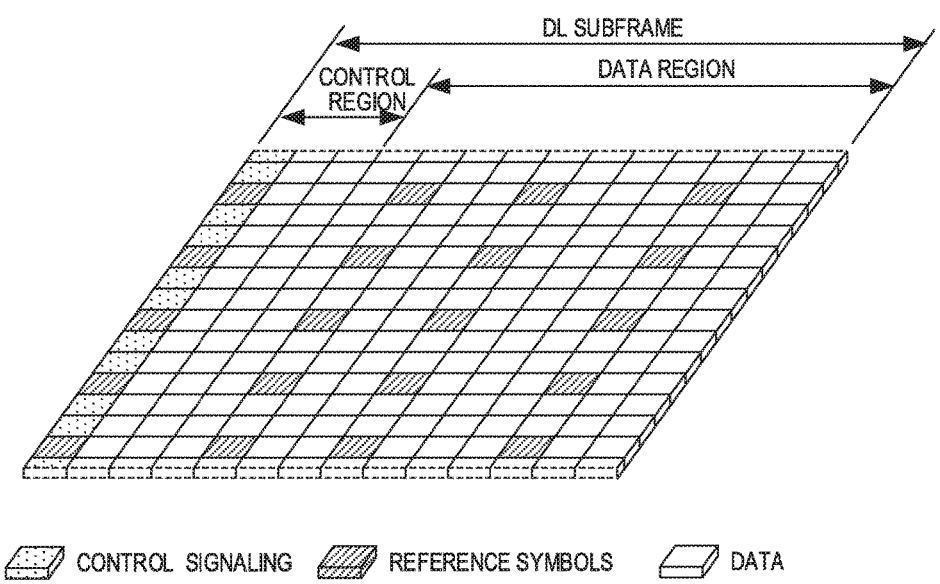
FIG. 3 is a schematic diagram of an example OFDM downlink subframe.
Figure 4:
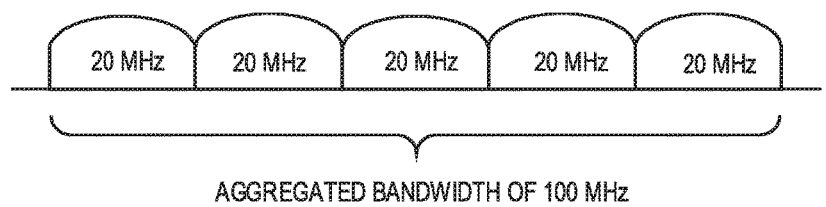
FIG. 4 is a schematic diagram of an example of Carrier Aggregation (CA)
Figure 6:
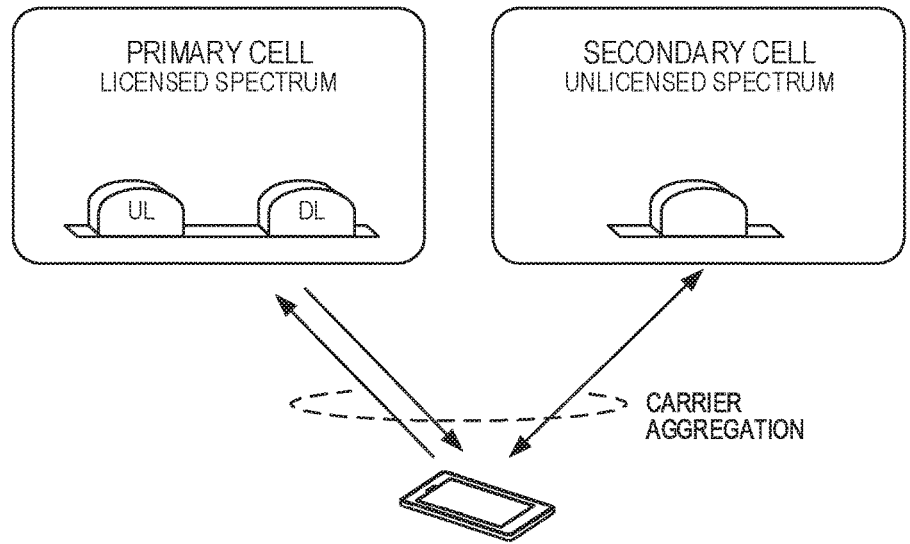
FIG. 6 is a schematic diagram of an example of Licensed Assisted Access (LAA) and unlicensed spectrum using LTE CA.
Figure 5:
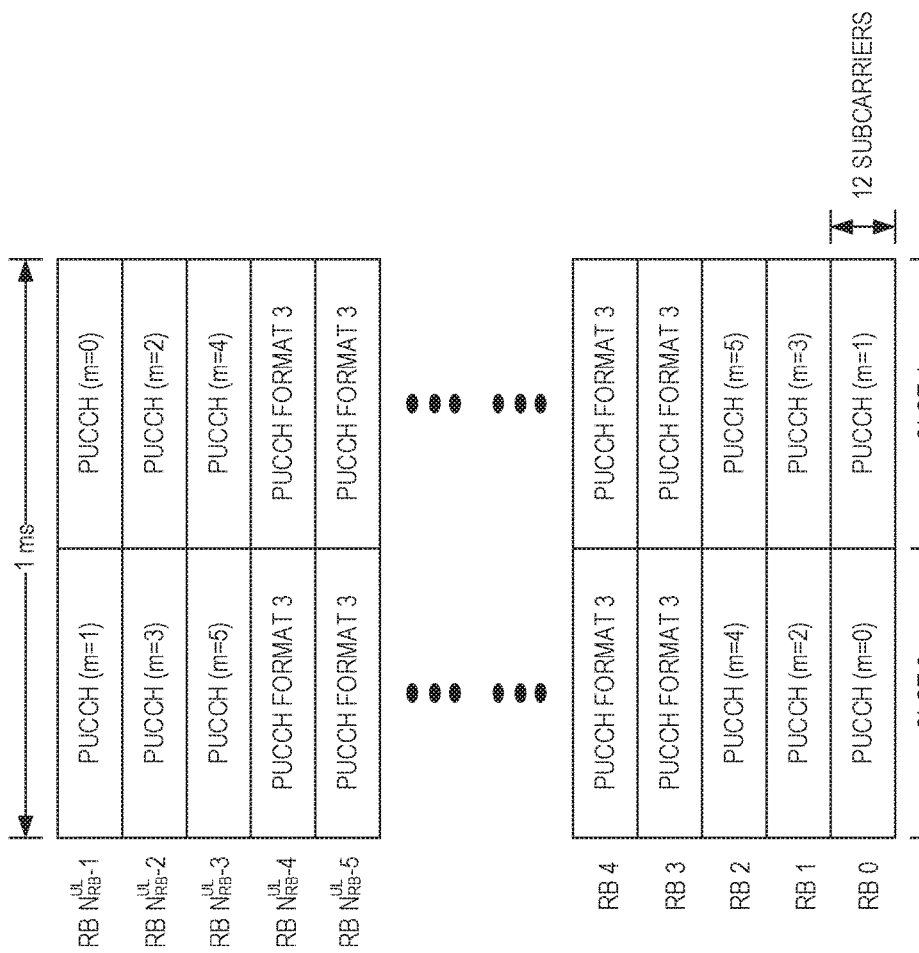
FIG. 5 is a schematic diagram illustrating the Physical Uplink Control Channel (PUCCH) uplink control structure with six (6) Physical Resource Blocks (PRBs)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

In the following description, numerous specific details are set forth. However, it is understood that embodiments of the present disclosure may be practiced without these specific details. In other instances, well-known circuits, structures, and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Radio Node: As used herein, a "radio node" is either a radio access node or a wireless device.

Radio Access Node: As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a $3^{rd}$ Generation Partnership Project (3GPP) Long Term Evolution (LTE) network), a high-power or macro base station, a low-power base station (e.g., a micro base station, a pico base station, a home eNB, or the like), and a relay node.

Wireless Device: As used herein, a "wireless device" is any type of type device that has access to (i.e., is served by) a cellular communications network by wirelessly transmitting and/or receiving signals to a radio access node(s). Some examples of a wireless device include, but are not limited to, a User Equipment device (UE) in a 3GPP LTE network and a Machine Type Communication (MTC) device.

Network Node: As used herein, a "network node" is any node that is either part of the radio access network or the core network of a cellular communications network/system.

Figure 7A:
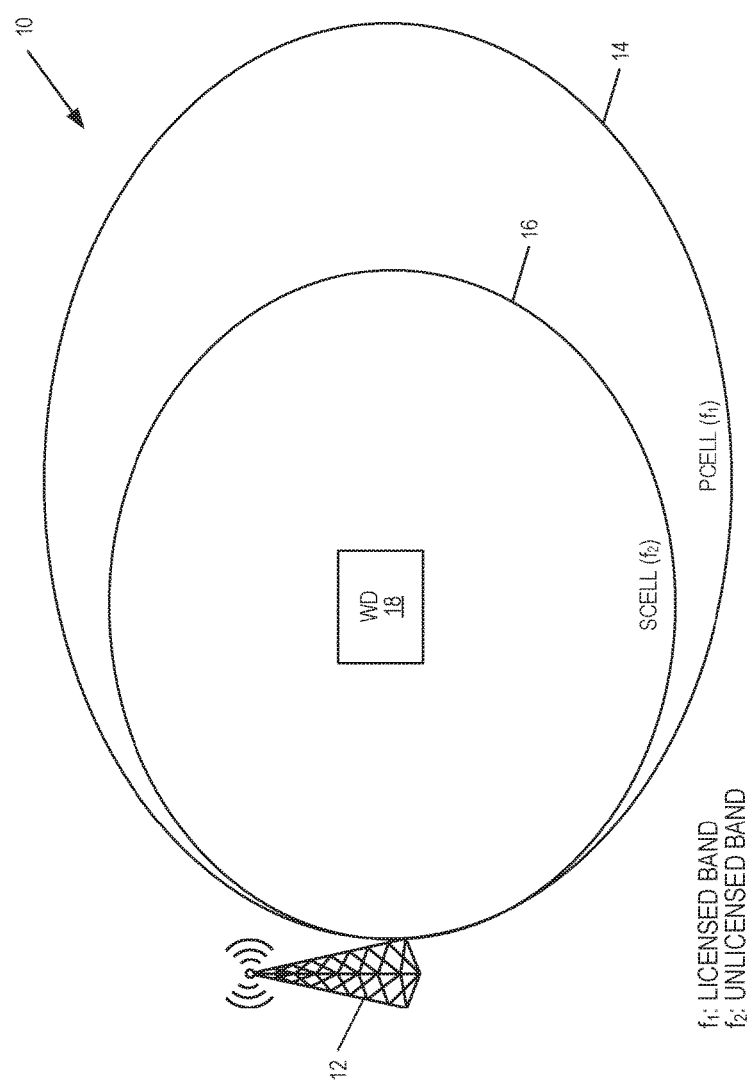
FIGS. 7A and 7B are schematic diagrams of two examples of a communications system in which preemptive transmissions are utilized on a Listen-Before-Talk (LBT) cell in accordance with embodiments of the present disclosure.
Figure 7B:
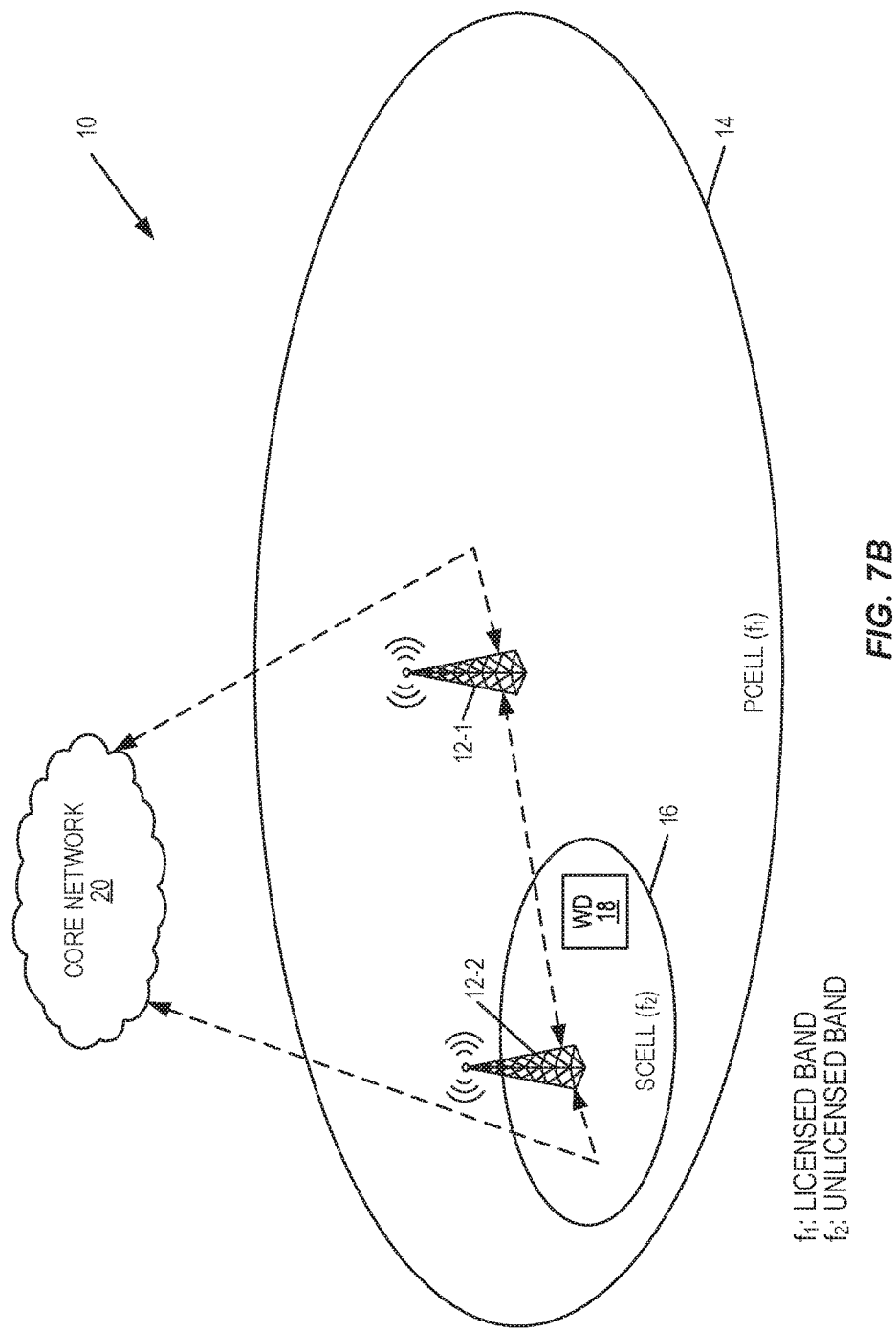

Embodiments of the present disclosure are implemented in a cellular communications network 10 (also referred to herein as a communications system), examples of which are illustrated in FIGS. 7A and 7B. In the example of FIG. 7A, the cellular communications network 10 includes a base station 12 (e.g., an eNB in LTE terminology) serving a cell 14 operating on a carrier $f_1$ in a licensed frequency spectrum and a cell 16 operating on a carrier $f_2$ in a unlicensed frequency spectrum (e.g., the 5 gigahertz (GHz) frequency spectrum). The cell 14 is configured as a Primary Cell (PCell) of a wireless device 18 (e.g., an LTE UE), and the cell 16 is configured as a Secondary Cell (SCell) of the wireless device 18. As such, with respect to the wireless device 18, the cell 14 is referred to as the PCell 14 of the wireless device 18, and the cell 16 is referred to as the SCell 16 or, more precisely, the License Assisted Access (LAA) SCell 16 of the wireless device 18. Importantly, while only one SCell 16 operating on a carrier in an unlicensed frequency spectrum is illustrated in FIG. 7A, there may be many SCells 16 that are configured for the wireless device 18 and that operate on carriers in the same unlicensed frequency spectrum or different unlicensed frequency spectrums.

While in the example of FIG. 7A the cells 14 and 16 are served by the same base station 12, the cells 14 and 16 may alternatively be served by separate base stations 12-1 and 12-2, respectively, as illustrated in FIG. 7B. The base stations 12-1 and 12-2 are communicatively connected to a core network 20 (e.g., an Evolved Packet Core (EPC)) and, in some embodiments, may communicate with one another either via a base-station-to-base-station interface (e.g., the X2 interface in LTE) or via the core network 20.

Systems and methods are disclosed herein that relate to transmitting Hybrid Automatic Repeat Request (HARQ) and/or Channel State Information (CSI) feedback for a downlink component carrier or downlink component carrier set, or group, from the wireless device 18 on an unlicensed uplink Component Carrier (CC). As used herein, a downlink CC group (also referred to herein as a downlink CC set) is a group of downlink CCs whose HARQ and/or CSI feedback is to be transmitted over the same uplink CC. Further, as used herein, a CC in an unlicensed frequency band (which is also referred to herein as an unlicensed CC) is "unavailable" when, via some carrier sense mechanism, a transmitting node (e.g., the wireless device 18 with respect to the uplink) determines that the CC is busy.

In particular, certain embodiments described herein propose methods and systems to conquer the channel availability problem when the HARQ and/or CSI feedback is configured to be transmitted over a first unlicensed CC by means of configuring at least one backup CC for HARQ and/or CSI feedback. For example, when the unlicensed CC is unavailable for HARQ and/or CSI feedback, the UE can determine at least one backup CC for the feedback.

According to some embodiments described herein, some feedback resource sets over at least one backup CC (or channel) can be configured for HARQ and/or CSI feedback in addition to the first feedback resource set over the first unlicensed CC. The backup CC can be either an unlicensed CC or a licensed CC. The wireless device 18 (which may be a UE) can determine (e.g., simultaneously) the channel availabilities for the first CC and the backup CC at the time to transmit HARQ and/or CSI feedback. When the first channel is unavailable, the wireless device 18 can transmit the HARQ and/or CSI feedback over one available backup CC, e.g., determined according to certain predefined rules. The base station 12 (which may be an eNB) can blindly decode the HARQ and/or CSI feedback over both the first unlicensed and the backup CCs.

Figure 8:
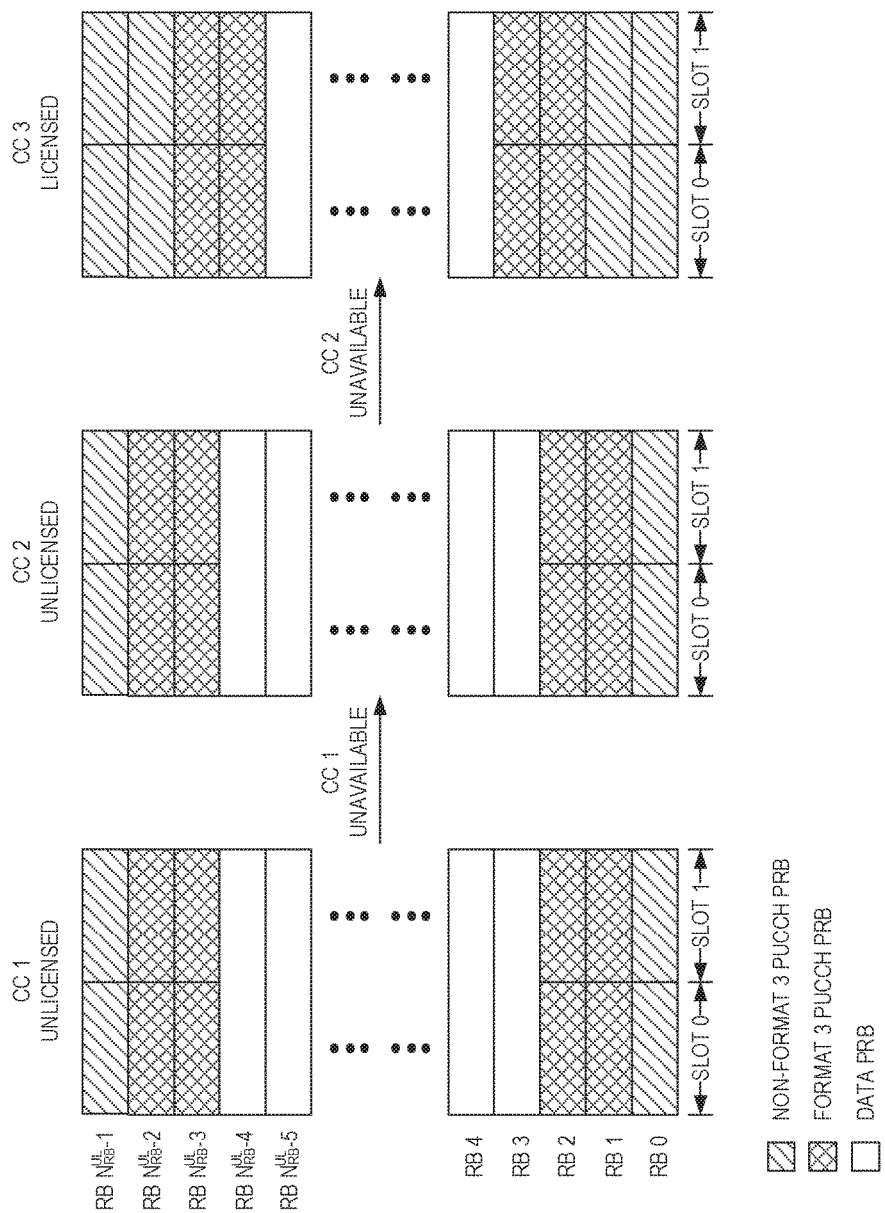
FIG. 8 illustrates one example of channel availability based Hybrid Automatic Repeat Request (HARQ) and/or Channel State Information (CSI) feedback using an unlicensed Component Carrier (CC) or one or more backup CCs according to some embodiments of the present disclosure.

FIG. 8 illustrates example of using backup CCs for HARQ and/or CSI feedback when the first CC is an unlicensed CC. The first CC is CC 1 (unlicensed) for the HARQ and/or CSI feedback of one downlink CC set. CC 2 (unlicensed) and CC 3 (licensed) are backup CCs of this downlink CC set. Note that while two backup CCs are illustrated in this example, there may be any number of one or more backup CCs. In this particular example, if CC 1 is unavailable at the time for transmitting HARQ and/or CSI feedback for the downlink CC set, then the wireless device 18 transmits the HARQ and/or CSI feedback on CC 2 if CC 2 is available. If both CC 1 and CC 2 are unavailable at the time for transmitting the HARQ and/or CSI feedback for the downlink CC set, then the wireless device 18 transmits the HARQ and/or CSI feedback on CC 3, which in this example is in a licensed frequency band.

According to some embodiments, when the HARQ and/or CSI feedback is configured to be transmitted over a first CC (unlicensed), at least one backup CC (e.g., CC 2 and CC 3 in the example of FIG. 8) can be configured for HARQ and/or CSI feedback. If the first CC is determined to be unavailable after carrier sensing, the wireless device 18 can select one available backup CC for the HARQ and/or CSI feedback. In FIG. 8, the HARQ and/or CSI feedback is preferred to be transmitted over CC 1, and CC 2 and CC 3 are configured to be backup CCs for HARQ and/or CSI feedback.

In some embodiments, the base station 12 can further configure the feedback resource (e.g., a Physical Resource Block (PRB) resource for a Physical Uplink Control Channel (PUCCH) set) which can be used to transmit HARQ and/or CSI feedback over each backup CC once the CC is selected. Multiple candidate CCs can share one feedback resource indicator and/or a CC specific resource indicator can be used. For instance, the unlicensed candidate carriers can share one resource indicator and the licensed carrier can use one specific resource indicator for HARQ and/or CSI feedback. For instance, if PUCCH format 3 is used, the backup PUCCH resource index to carry PUCCH format 3 over CC 1 and CC 2 can be configured to be the same value and indicated with one resource indicator, while the PUCCH resource index over CC 3 can be configured with another resource indicator.

In some embodiments, a certain priority order to select the backup CC could be configured in order to assist in determining, or selecting, which backup CC to use for HARQ and/or CSI feedback when multiple backup CCs are available for feedback message transmission. This may be beneficial to avoid the too high feedback load over one backup CC. As one example, in practice, the licensed carrier may be configured to be one backup carrier for many unlicensed carriers (or carrier groups). In this example, if the licensed backup CC is selected first when the first CC is not available, then the HARQ and/or CSI feedback load over the licensed CC could vary largely and sometimes could be too high to ensure the radio quality of the feedback message. In the example of FIG. 8, a certain order to use the backup channel is illustrated, if CC 1 is unavailable but CC 2 is available, then the wireless device 18 can use CC 2 no matter if CC 3 (licensed) is available or not. CC 3 is used only when both CC 1 and CC 2 are unavailable.

In some embodiments, the wireless device 18 can monitor the channel availability for both the first and backup CCs for HARQ and/or CSI feedback simultaneously at the time point to transmit HARQ and/or CSI feedback. Based on the determined channel availability information, the wireless device 18 can select the CC for HARQ and/or CSI feedback.

In some embodiments, the base station 12 can blindly decode the HARQ and/or CSI feedback message over all candidate CCs according to certain order, e.g. the priority descending order of candidate CCs. As used herein, a "candidate" CC is one of the first CC and the one or more backup CCs configured for the wireless device 18. When the desired feedback message is detected over any of the candidate CCs (i.e., the first or backup CCs), the base station 12 can, at least in some embodiments, stop the decoding of other candidate CCs.

In some embodiments, the candidate CC of lowest priority to carry the HARQ and/or CSI feedback message for an unlicensed carrier can be a licensed CC in order to control the feedback load of the licensed carrier.

In some embodiments, one CC can be configured to be a backup CC for HARQ and/or CSI feedback message transmission for multiple CCs or CC groups. The configured resources for the HARQ and/or CSI feedback messages of different CC groups can be orthogonal in time/frequency domain.

Figure 9:
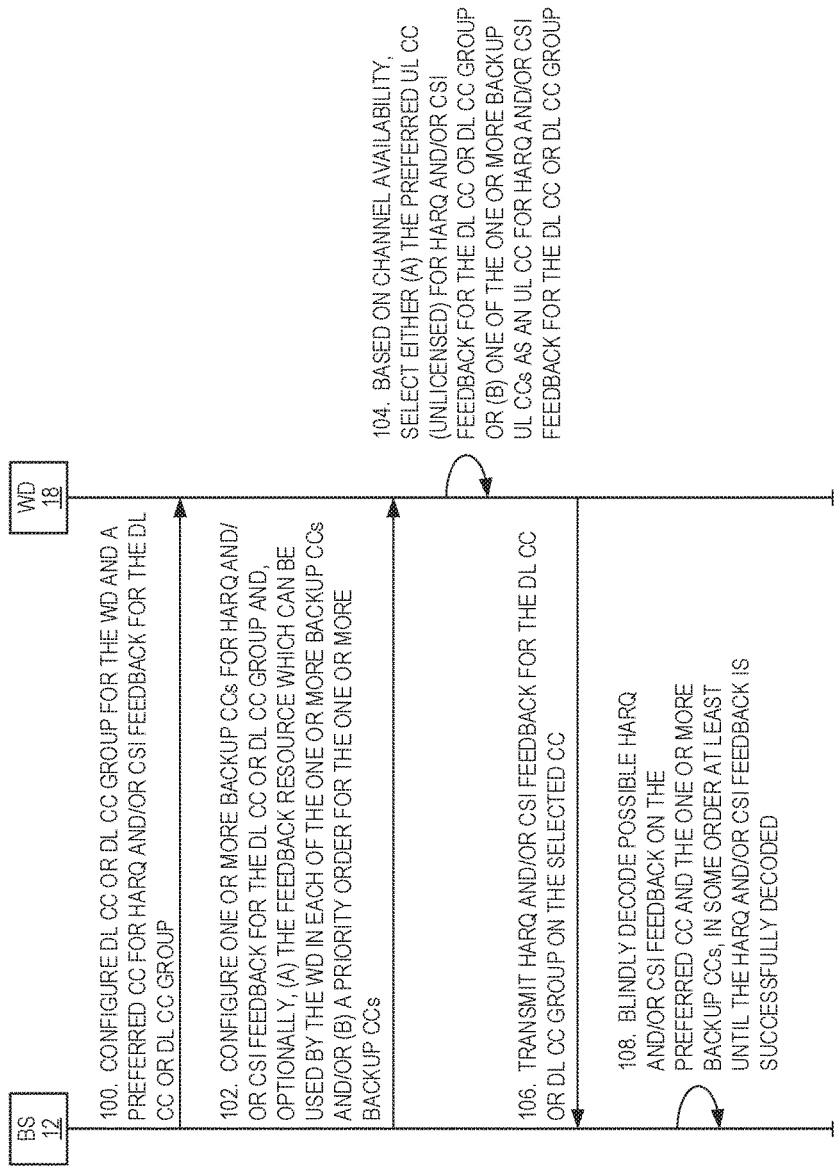
FIG. 9 illustrates the operation of a base station and a wireless device to enable transmission of HARQ and/or CSI feedback on an unlicensed CC according to some embodiments of the present disclosure.

FIG. 9 illustrates the operation of the base station 12 and the wireless device 18 according to at least some of the embodiments described above. As illustrated, the base station 12 configures a downlink CC or a downlink CC group for the wireless device 18 as well as a first, or preferred, CC for HARQ and/or CSI feedback for the downlink CC or downlink CC group (step 100). The base station 12 also configures one or more backup CCs for HARQ and/or CSI feedback for the downlink CC or downlink CC group (step 102). Optionally (i.e., in some embodiments), the base station 12 also configures: (A) the feedback resource which can be used by the wireless device 18 in each of the one or more backup CCs and/or (B) a priority order for the one or more backup CCs, as described above. The feedback resource may include, for example, the PRB that the wireless device 18 can use in the respective CC. Further, in some embodiments, the feedback resources for at least some of the one or more backup CCs may be configured via a common, or shared, feedback resource indicator. For example, in some embodiments, one feedback resource indicator may be provided for all CCs (e.g., both the preferred, or first, CC and any backup CCs for HARQ and/or CSI feedback that are in an unlicensed frequency spectrum), and another feedback resource indicator may be provided for any backup CC(s) that are in a licensed frequency spectrum. In other embodiments, a separate feedback resource indicator may be provided for each backup CC.

At the wireless device 18, when it is time for HARQ and/or CSI feedback for the downlink CC or the downlink CC group configured for the wireless device 18, the wireless device 18 selects, based on channel availability, either (A) the preferred CC configured for the wireless device 18 for HARQ and/or CSI feedback for the downlink CC or the downlink CC group or (B) one of the one or more backup CCs configured for the wireless device 18 for HARQ and/or CSI feedback for the downlink CC or the downlink CC group (step 104). The wireless device 18 then transmits the HARQ and/or CSI feedback for the downlink CC or the downlink CC group on the selected CC (step 106).

At the base station 12, the base station 12 blindly decodes possible HARQ and/or CSI feedback on the preferred CC and the one or more backup CCs configured for the wireless device 18 for HARQ and/or CSI feedback for the downlink CC or the downlink CC group (step 108). In some embodiments, the base station 12 blindly decodes possible HARQ and/or CSI feedback on the preferred CC and the one or more backup CCs in some defined order (e.g., the preferred CC first and then the one or more backup CCs in, e.g., a predefined priority order, which may be the same priority order as that utilized by the wireless device 18 when selecting the CC on which to transmit the HARQ and/or CSI feedback). Further, in some embodiments, the base station 12 performs blind decoding on the preferred CC and the one or more backup CCs in the defined order until the HARQ and/or CSI feedback from the wireless device 18 is successfully decoded.

Note that while the base station 12 is referred to in the example of FIG. 9, it should be understood that, with respect to the architecture of FIG. 7B, the base station 12 that configures the downlink CC or downlink CC group for the wireless device 18 and configures the one or more backup CCs for HARQ and/or CSI feedback for the downlink CC or downlink CC group for the wireless device 18 may be, for example, the base station 12-1 of the PCell 14 of the wireless device 18, but the base station 12 that blindly decodes the possible HARQ and/or CSI feedback on the first uplink CC and the one or more backup uplink CCs for HARQ and/or CSI feedback from the wireless device 18 may be the base station 12-1, the base station 12-2, or both the base station 12-1 and the base station 12-2, depending on the particular embodiment.

Figure 10:
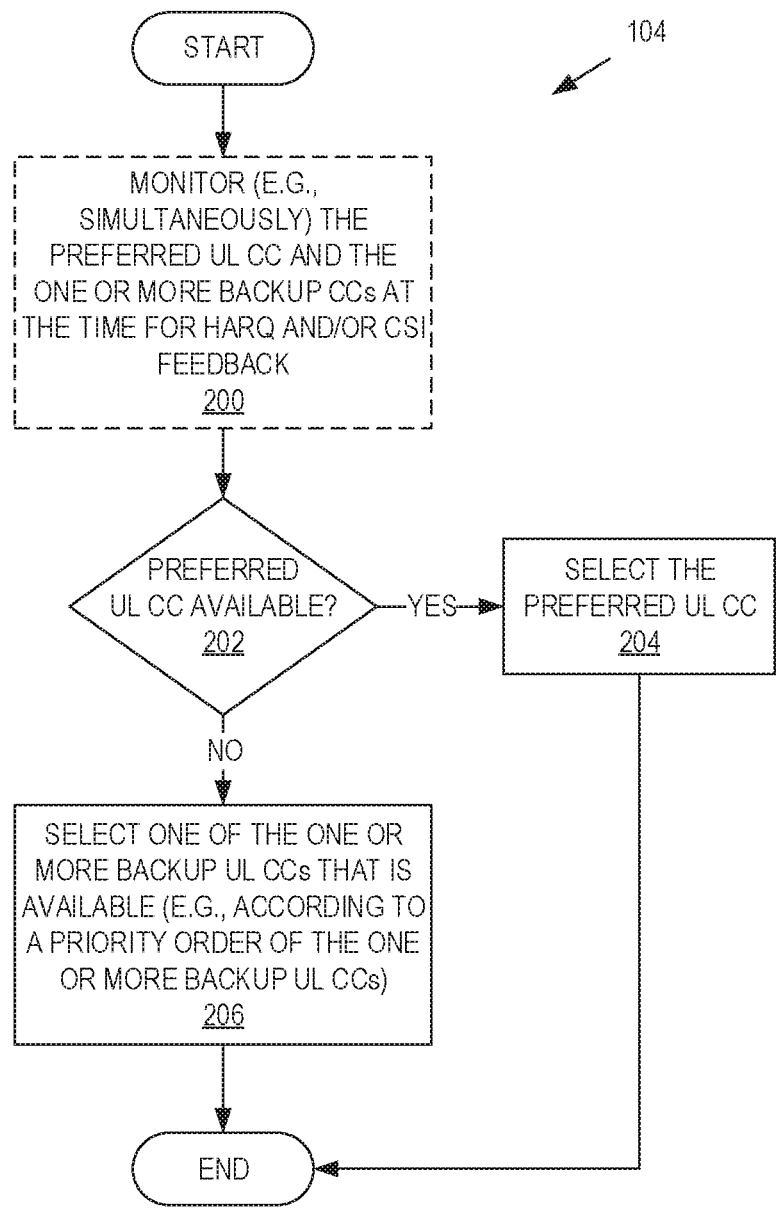
FIG. 10 is a flow chart that illustrates the operation of a wireless device according to some embodiments of the present disclosure.

FIG. 10 is a flow chart that illustrates step 104 of FIG. 9 in more detail according to some embodiments of the present disclosure. In some embodiments, the wireless device 18 monitors (e.g., simultaneously) the preferred uplink CC and the one or more backup CCs at the time for HARQ and/or CSI feedback for the downlink CC or downlink CC group (step 200). In some embodiments, the wireless device 18 monitors the preferred uplink CC and the one or more backup uplink CCs simultaneously. Notably, any of the backup uplink CCs in a licensed frequency spectrum can be assumed to be always available. In contrast, the wireless device 18 may perform some Listen-Before-Talk (LBT) procedure, or carrier sense procedure, to determine whether any of the uplink CCs that are in an unlicensed frequency spectrum is available. The wireless device 18 determines whether the preferred uplink CC is available (step 202). If so, the wireless device 18 selects the preferred uplink CC as the uplink CC for transmission of the HARQ and/or CSI feedback for the downlink CC or downlink CC group (step 204). However, if the preferred uplink CC is not available, the wireless device 18 selects one of the one or more backup uplink CCs for HARQ and/or CSI feedback that is available as the uplink CC for transmitting the HARQ and/or CSI feedback (step 206). In some embodiments, the wireless device 18 selects one of the backup uplink CCs according to channel availability and a predefined priority order. In other words, in some embodiments, the wireless device 18 considers the one or more backup uplink CCs in the predefined priority order and selects, e.g., the first backup uplink CC that is available.

Figure 11:
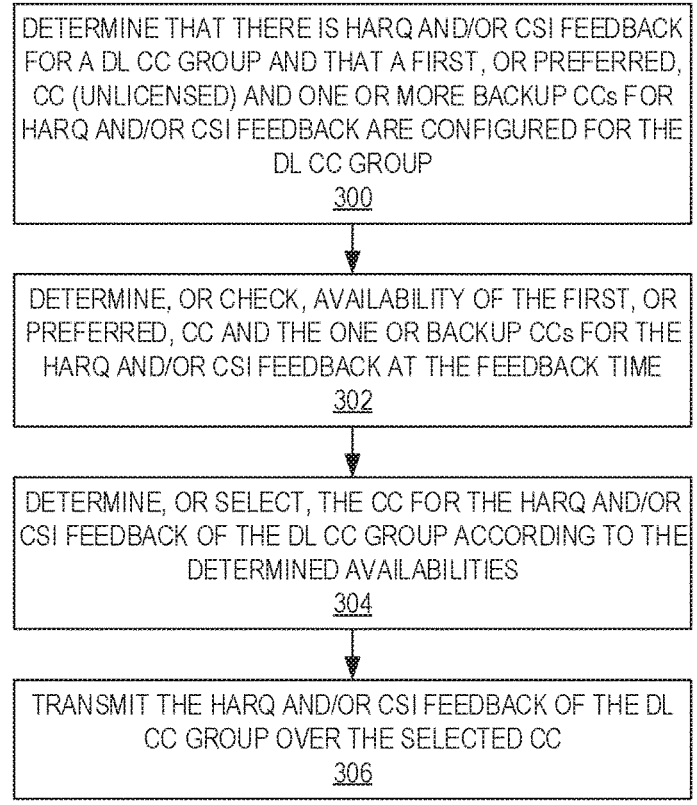
FIGS. 11 and 12 are flow charts that illustrate the operation of a base station according to some embodiments of the present disclosure.

FIG. 11 is a flow chart that illustrates the operation of the wireless device 18 according to some embodiments of the present disclosure. In other words, FIG. 11 illustrates one example of a wireless device-side procedure. The wireless device 18 determines that there is HARQ and/or CSI feedback for a downlink CC group and that a first, or preferred, CC in an unlicensed frequency spectrum and one or more backup CCs for HARQ and/or CSI feedback are configured (for the wireless device 18) for the downlink CC group (step 300). More specifically, for a downlink CC group, there are configured feedback resources over first CC (unlicensed) and backup feedback resource sets over at least one backup CC. When there is HARQ and/or CSI feedback for the downlink CC group, the wireless device 18 determines, or checks, the channel availability of the first unlicensed CC and backup CCs for the HARQ and/or CSI feedback at the feedback time (e.g., just before the feedback time) (step 302). Then, the wireless device 18 determines, or selects, the CC for HARQ and/or CSI feedback according to the determined channel availabilities of the first unlicensed CC and the one or more backup CCs and, in this example, predefined priority order (step 304) and transmits the HARQ and/or CSI feedback over the configured backup feedback resource set over the selected CC (step 306).

Figure 12:
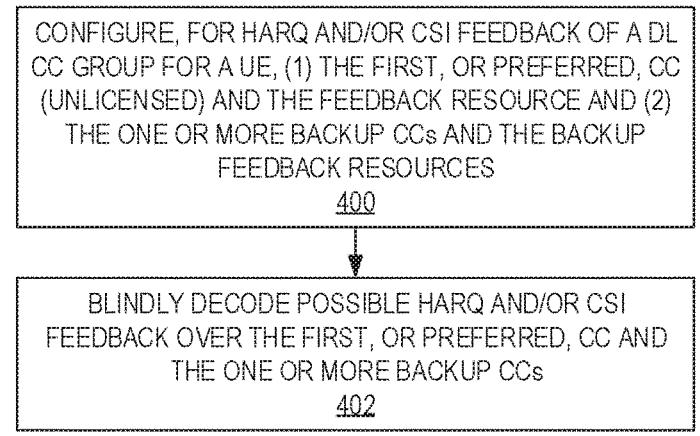

FIG. 12 is a flow chart that illustrates the operation of the base station 12 according to some embodiments of the present disclosure. In other words, FIG. 12 illustrates one example of a base station-side procedure. The base station 12 configures the (first or preferred) unlicensed CC and one or more backup CCs for HARQ and/or CSI feedback for a downlink CC group (step 400). In this example, the configuration includes both a CC index for each of the configured CCs and feedback resource indications. Then, the base station 12 blindly decodes the possible feedback over both the unlicensed CC and the backup CC(s) until the expected feedback message is detected or all the possible feedback resources are processed (step 402).

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Figure 13:
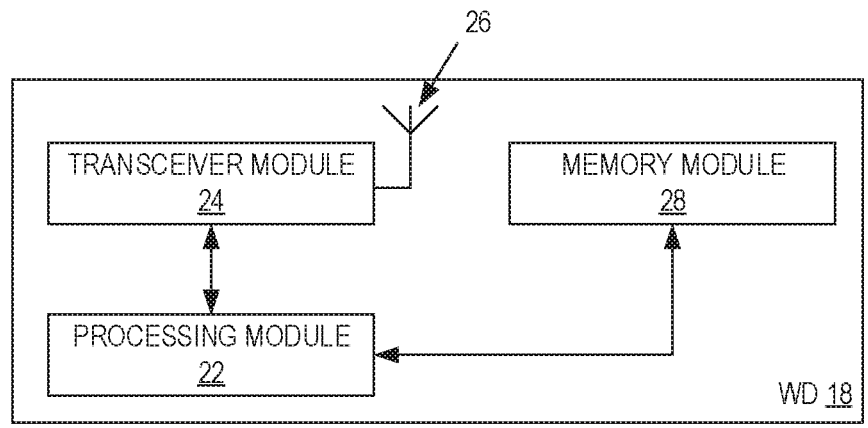
FIGS. 13 and 14 are schematic diagrams of a wireless device in accordance with some embodiments of the present disclosure.

FIG. 13 is a block diagram of the wireless device 18 (e.g., a UE such as, for example, a mobile device) according to one exemplary embodiment of the present disclosure. The wireless device 18 of FIG. 13 can be used in one or more of the non-limiting example embodiments described herein. The wireless device 18 may in some embodiments be a mobile device that is configured for Machine-to-Machine (M2M) or MTC. The wireless device 18 comprises a processing module 22 that controls the operation of the wireless device 18. The processing module 22 includes processing circuitry such as, for example, one or more Central Processing Units (CPUs), one or more Application Specific Integrated Circuits (ASICs), one or more Field Programmable Gate Arrays (FPGAs), and/or the like. The processing module 22 is connected to a transceiver module 24 with associated antenna(s) 26 which are used to receive signals from or both transmit signals to and receive signals from the base station 12 (FIG. 7A) or the base stations 12-1 and 12-2 (FIG. 7B) in the cellular communications network 10. The transceiver module 24 includes one or more transmitters and one or more receivers. To make use of Discontinuous Reception (DRX), the processing module 22 can be configured to deactivate the receiver or transceiver module 24 for specified lengths of time. The wireless device 18 also comprises a memory module 28 that is connected to the processing module 22 and that stores program and other information and data required for the operation of the wireless device 18.

In some embodiments, a computer program including instructions which, when executed by at least one processor, causes the at least one processor to carry out the functionality of the wireless device 18 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 14:
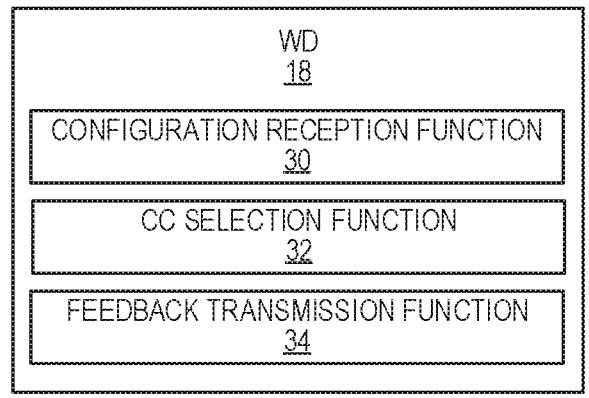

FIG. 14 is a block diagram of the wireless device 18 according to some other embodiments of the present disclosure. As illustrated, the wireless device 18 includes a configuration reception function 30, a CC selection function 32, and a feedback transmission function 34, each of which is implemented in software. The configuration reception function 30 operates to receive (via an associated receiver of the wireless device 18) configuration of the downlink CC or downlink CC group, the unlicensed CC for HARQ and/or CSI feedback for the downlink CC or downlink CC group, and the one or more backup CCs for HARQ and/or CSI feedback for the downlink CC or downlink CC group, as described above. The CC selection function 32 operates to select the first unlicensed CC or one of the one or more backup CCs for HARQ and/or CSI feedback for the downlink CC or downlink CC group, as described above. The feedback transmission function 34 operates to transmit (via an associated transmitter of the wireless device 18) HARQ and/or CSI feedback for the downlink CC or downlink CC group on the selected CC, as described above.

Figure 15:
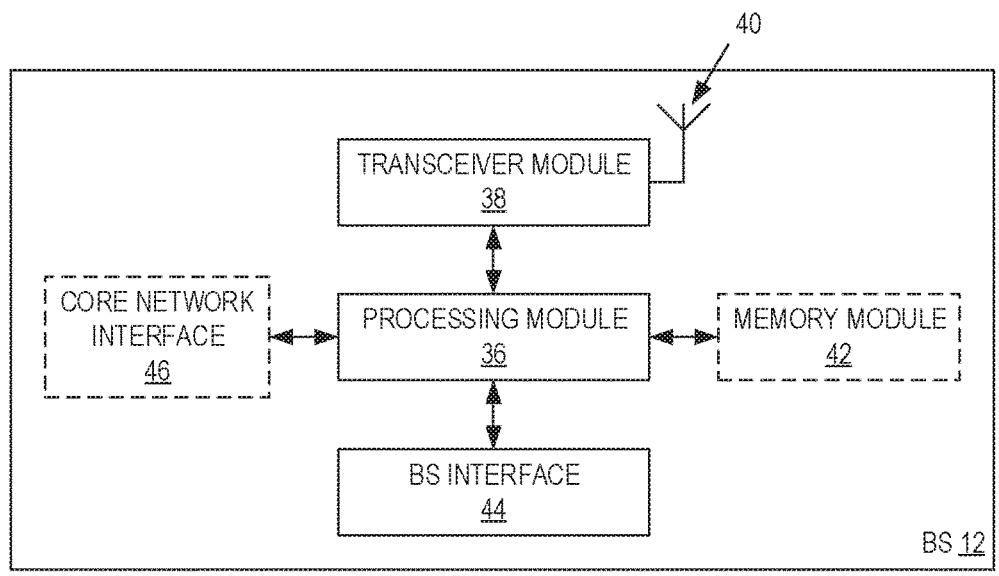
FIGS. 15 and 16 are schematic diagrams of a base station in accordance with some embodiments of the present disclosure.

FIG. 15 shows the base station 12 (for example a Node B or an eNB) that can be used in example embodiments described herein. This discussion is equally applicable to the base stations 12-1 and 12-2. It will be appreciated that although a macro eNB will not in practice be identical in size and structure to a micro eNB, for the purposes of illustration, the base stations 12 are assumed to include similar components. Thus, the base station 12 comprises a processing module 36 that controls the operation of the base station 12. The processing module 36 includes processing circuitry such as, for example, one or more CPUs, one or more ASICs, one or more FPGAs, and/or the like. The processing module 36 is connected to a transceiver module 38 with associated antenna(s) 40 which are used to transmit signals to, and receive signals from, wireless devices 18 in the cellular communications network 10. The base station 12 also comprises a memory module 42 that is connected to the processing module 36 and that stores program and other information and data required for the operation of the base station 12. The base station 12 also includes components and/or circuitry 44 for allowing the base station 12 to exchange information with other base stations 12 (for example via an X2 interface) and components and/or circuitry 46 for allowing the base station 12 to exchange information with nodes in a core network (for example via the S1 interface). It will be appreciated that base stations for use in other types of networks (e.g., Universal Terrestrial Radio Access Network (UTRAN) or Wideband Code Division Multiple Access (WCDMA) Radio Access Network (RAN)) will include similar components to those shown in FIG. 14 and appropriate interface circuitry 44, 46 for enabling communications with the other network nodes in those types of networks (e.g., other base stations, mobility management nodes, and/or nodes in the core network).

In some embodiments, a computer program including instructions which, when executed by at least one processor, causes the at least one processor to carry out the functionality of the base station 12 (or the base station 12-1 or 12-2) according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 16:
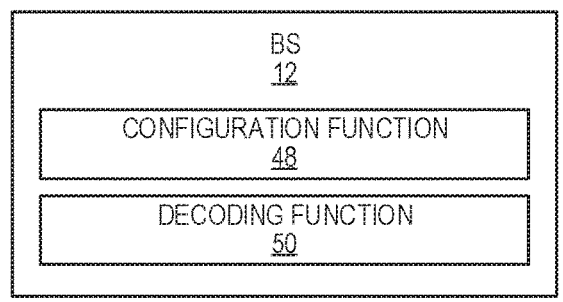

FIG. 16 is a block diagram of the base station 12 (or the base station 12-1 or 12-2) according to some other embodiments of the present disclosure. As illustrated, the base station 12 includes a configuration function 48 and a decoding function 50, each of which is implemented in software. The configuration function 48 operates to send (via an associated transmitter of the base station 12), to the wireless device 18, configuration of the downlink CC or downlink CC group, the unlicensed CC for HARQ and/or CSI feedback for the downlink CC or downlink CC group, and the one or more backup CCs for HARQ and/or CSI feedback for the downlink CC or downlink CC group, as described above. The decoding function 50 operates to blindly decode potential HARQ and/or CSI feedback from the wireless device 18 for the downlink CC or downlink CC group on the configured CCs for HARQ and/or CSI feedback from the wireless device 18 for the downlink CC or downlink CC group, as described above.

The following acronyms are used throughout this disclosure.

μs Microsecond
3GPP 3$^{rd}$ Generation Partnership Project
ACK Acknowledgement
AP Access Point
ASIC Application Specific Integrated Circuit
CA Carrier Aggregation
CC Component Carrier
CCA Clear Channel Assessment
CFI Control Format Indicator
CIF Carrier Indicator Field
CPU Central Processing Unit
CRS Cell specific Reference Symbol
CSI Channel State Information
CSMA/CA Carrier Sense Multiple Access with Collision Avoidance
DCI Downlink Control Information
DFT Discrete Fourier Transform
DRX Discontinuous Reception
eNB Enhanced or Evolved Node B EPC Evolved Packet Core
EPDCCH Enhanced Physical Downlink Control Channel
FDD Frequency Division Duplexing
FeCA Further Enhancement of Carrier Aggregation
FPGA Field Programmable Gate Array
GHz Gigahertz
HARQ Hybrid Automatic Repeat Request
LAA License Assisted Access
LBT Listen-Before-Talk
LTE Long Term Evolution
M2M Machine-to-Machine
MHz Megahertz
MIMO Multiple Input Multiple Output
ms Millisecond
MTC Machine Type Communication
NACK Negative Acknowledgement
OFDM Orthogonal Frequency Division Multiplexing
PCell Primary Cell
PDCCH Physical Downlink Control Channel
PDSCH Physical Downlink Shared Channel
PRB Physical Resource Block
PUCCH Physical Uplink Control Channel
PUSCH Physical Uplink Shared Channel
RAN Radio Access Network
Rel-8 Release 8
Rel-10 Release 10
Rel-11 Release 11
RRC Radio Resource Control
SCC Secondary Component Carrier
SCell Secondary Cell
SC-FDMA Single Carrier Frequency Division Multiple Access
SR Scheduling Request
TDD Time Division Duplexing
TPC Transmitter Power Control
TTI Transmit Time Interval
UCI Uplink Control Information
UE User Equipment
UTRAN Universal Terrestrial Radio Access Network
WCDMA Wideband Code Division Multiple Access
WLAN Wireless Local Area Network Those skilled in the art will recognize improvements and modifications to the embodiments of the present disclosure. All such improvements and modifications are considered within the scope of the concepts disclosed herein and the claims that follow.

What is claimed is:

1. A method of operation of a wireless device in a cellular communications network, comprising:
    selecting, from a plurality of uplink component carriers configured for the wireless device for Hybrid Automatic Repeat Request, HARQ, and/or Channel State Information, CSI, feedback of a downlink component carrier or a downlink component carrier group, an uplink component carrier for HARQ and/or CSI feedback of the downlink component carrier or the downlink component carrier group based on channel availability, each component carrier of the plurality of uplink component carriers occupying a different frequency range; and
    transmitting HARQ and/or CSI feedback of the downlink component carrier or the downlink component carrier group over the uplink component carrier selected from the plurality of uplink component carriers configured for the wireless device,
    wherein the plurality of uplink component carriers configured for the wireless device for HARQ and/or CSI feedback of the downlink component carrier or the downlink component carrier group comprises:
        at least a first uplink component carrier in an unlicensed frequency spectrum; and
        one or more additional uplink component carriers, at least one of which comprises an uplink component carrier in a licensed frequency spectrum.

2. The method of claim 1 wherein:
    selecting the uplink component carrier for HARQ and/or CSI feedback of the downlink component carrier or the downlink component carrier group comprises at least one of:
        determining that a respective channel over which the first uplink component carrier is transmitted is available and selecting the first uplink component carrier as the uplink component carrier for HARQ and/or CSI feedback of the downlink component carrier or the downlink component carrier group upon determining that the respective channel over which the first uplink component carrier is transmitted is available; and
        determining that the respective channel over which the first uplink component carrier is transmitted is unavailable and selecting one of the one or more additional uplink component carriers as the uplink component carrier for HARQ and/or CSI feedback of the downlink component carrier or the downlink component carrier group upon determining that the respective channel over which the first uplink component carrier is transmitted is unavailable.

3. The method of claim 2 wherein the selected one of the one or more additional uplink component carriers is in a licensed frequency spectrum.

4. The method of claim 2 wherein the selected one of the one or more additional uplink component carriers is in an unlicensed frequency spectrum.

5. The method of claim 2 further comprising:
    receiving, from a base station of the cellular communications network, a configuration of the downlink component carrier or the downlink component carrier group for the wireless device, the configuration comprising a configuration of the first uplink component carrier for HARQ and/or CSI feedback of the downlink component carrier or the downlink component carrier group; and
    receiving, from the base station, a configuration of the one or more additional uplink component carriers and a feedback resource on each of the one or more additional uplink component carriers;
    wherein transmitting the HARQ and/or CSI feedback comprises transmitting the HARQ and/or CSI feedback over the uplink component carrier using the feedback resource configured for the uplink component carrier.

6. The method of claim 5 wherein the one or more additional uplink component carriers comprise a plurality of additional uplink component carriers, and receiving the configuration of the one or more additional uplink component carriers and the feedback resource on each of the one or more additional uplink component carriers comprises receiving a single feedback resource indicator for at least two of the plurality of additional uplink component carriers.

7. The method of claim 5 wherein the one or more additional uplink component carriers comprise a plurality of additional uplink component carriers, and receiving the configuration of the one or more additional uplink component carriers and the feedback resource on each of the one or more additional uplink component carriers comprises receiving a separate feedback resource indicator for each of the plurality of additional uplink component carriers.

8. The method of claim 5 wherein the selected one of the one or more additional uplink component carriers is also configured for HARQ and/or CSI feedback for another downlink component carrier or another downlink component carrier group, and a frequency resource configured for the selected one of the one or more additional uplink component carriers is orthogonal, in the time/frequency domain, to a frequency resource configured for the selected one of the one or more additional uplink component carriers for HARQ and/or CSI feedback for the other downlink component carrier or the other downlink component carrier group.

9. The method of claim 2 wherein selecting one of the one or more additional uplink component carriers as the uplink component carrier for HARQ and/or CSI feedback of the downlink component carrier or the downlink component carrier group upon determining that the respective channel over which the first uplink component carrier is transmitted is unavailable comprises:
selecting one of the one or more additional uplink component carriers as the uplink component carrier for HARQ and/or CSI feedback of the downlink component carrier or the downlink component carrier group according to a predefined priority order of the one or more additional uplink component carriers.

10. The method of claim 9 wherein the uplink component carrier in the licensed frequency band is assigned a lowest priority in the predefined priority order of the one or more additional uplink component carriers.

11. The method of claim 2 wherein the selected one of the one or more additional uplink component carriers is in an unlicensed frequency spectrum, and selecting the uplink component carrier for HARQ and/or CSI feedback of the downlink component carrier or the downlink component carrier group further comprises monitoring channel availability for the first uplink component carrier and the selected one of the one or more additional uplink component carriers.

12. The method of claim 2 wherein the selected one of the one or more additional uplink component carriers is in an unlicensed frequency spectrum, and selecting the uplink component carrier for HARQ and/or CSI feedback of the downlink component carrier or the downlink component carrier group further comprises simultaneously monitoring channel availability for the first uplink component carrier and the selected one of the one or more additional uplink component carriers.

13. The method of claim 1, further comprising:
determining that there is HARQ and/or CSI feedback for the downlink component carrier group and that the first uplink component carrier and the one or more additional uplink component carriers for HARQ and/or CSI feedback are configured for the downlink component carrier group; and
determining channel availability for the first uplink component carrier and the one or more additional uplink component carriers at a time at which the HARQ and/or CSI feedback is to be transmitted.

14. The method of claim 13 wherein:
selecting the uplink component carrier comprises selecting, from the first uplink component carrier and the one or more additional uplink component carriers, the uplink component carrier for the HARQ and/or CSI feedback of the downlink component carrier group based on the channel availability determined for the first uplink component carrier and the one or more additional uplink component carriers at a time at which the HARQ and/or CSI feedback is to be transmitted; and
transmitting the HARQ and/or CSI feedback comprises transmitting the HARQ and/or CSI feedback of the downlink component carrier group over the uplink component carrier selected from the first uplink component carrier and the one or more additional uplink component carriers configured for the wireless device.

15. A wireless device enabled to operate in a cellular communications network, comprising:
a transceiver module comprising one or more transmitters and one or more receivers;
a processing module comprising one or more processing circuits; and
a memory module comprising memory storing instructions executable by the one or more processing circuits, whereby the wireless device is operable to:
select, from a plurality of uplink component carriers configured for the wireless device for Hybrid Automatic Repeat Request, HARQ, and/or Channel State Information, CSI, feedback of a downlink component carrier or a downlink component carrier group, an uplink component carrier for HARQ and/or CSI feedback of the downlink component carrier or the downlink component carrier group based on channel availability, each component carrier of the plurality of uplink component carriers occupying a different frequency range; and
transmit, via the transceiver module, HARQ and/or CSI feedback of the downlink component carrier or the downlink component carrier group over the uplink component carrier selected from the plurality of uplink component carriers configured for the wireless device,
wherein the plurality of uplink component carriers configured for the wireless device for HARQ and/or CSI feedback of the downlink component carrier or the downlink component carrier group comprises:
at least a first uplink component carrier in an unlicensed frequency spectrum; and
one or more additional uplink component carriers, at least one of which comprises an uplink component carrier in a licensed frequency spectrum.

16. A method of operation of a radio access node in a cellular communications network, comprising:
configuring a plurality of uplink component carriers for a wireless device for Hybrid Automatic Repeat Request, HARQ, and/or Channel State Information, CSI, feedback of a downlink component carrier or a downlink component carrier group, the plurality of uplink component carriers comprising at least a first uplink component carrier in an unlicensed frequency spectrum and one or more additional uplink component carriers, at least one of which comprises an uplink component carrier in a licensed frequency spectrum, each component carrier of the plurality of uplink component carriers occupying a different frequency range; and
blindly decoding HARQ and/or CSI feedback of the downlink component carrier or the downlink component carrier group over at least one of the plurality of uplink component carriers configured for the wireless device for HARQ and/or CSI feedback of the downlink component carrier or the downlink component carrier group.

17. The method of claim 16 wherein at least one of the one or more additional uplink component carriers is in a licensed frequency spectrum.

18. The method of claim 16 wherein at least one of the one or more additional uplink component carriers is in an unlicensed frequency spectrum.

19. The method of claim 16 wherein configuring the plurality of uplink component carriers comprises configuring a feedback resource for each of the first uplink component carrier and the one or more additional uplink component carriers.

20. The method of claim 19 wherein the one or more additional uplink component carriers comprises a plurality of additional uplink component carriers, and configuring the feedback resource for each of the first uplink component carrier and the one or more additional uplink component carriers comprises providing, to the wireless device, a single feedback resource indicator for at least two of the plurality of additional uplink component carriers.

21. The method of claim 19 wherein the one or more additional uplink component carriers comprise a plurality of additional uplink component carriers, and configuring the feedback resource for each of the first uplink component carrier and the one or more additional uplink component carriers comprises providing, to the wireless device, a separate feedback resource indicator for each of the plurality of additional uplink component carriers.

22. The method of claim 16 wherein blindly decoding HARQ and/or CSI feedback of the downlink component carrier or the downlink component carrier group over at least one of the plurality of uplink component carriers comprises:
blindly decoding HARQ and/or CSI feedback of the downlink component carrier or the downlink component carrier group over at least one of the plurality of uplink component carriers according to a predefined priority order.

23. The method of claim 22 wherein the one or more additional uplink component carriers comprises a component carrier in a licensed frequency band, and the component carrier in the licensed frequency band is assigned a lowest priority in the predefined priority order.

24. The method of claim 16 wherein at least one of the one or more additional uplink component carriers is also configured for HARQ and/or CSI feedback for another downlink component carrier or another downlink component carrier group, and a frequency resource configured for the at least one of the one or more additional uplink component carriers is orthogonal, in the time/frequency domain, to a frequency resource configured for the at least one of the one or more additional uplink component carriers for HARQ and/or CSI feedback for the other downlink component carrier or the other downlink component carrier group.

25. A radio access node in a cellular communications network, comprising:
a transceiver module comprising one or more transmitters and one or more receivers;
a processing module comprising one or more processing circuits; and
a memory module comprising memory storing instructions executable by the one or more processing circuits, whereby the radio access node is operable to:
configure a plurality of uplink component carriers for a wireless device for Hybrid Automatic Repeat Request, HARQ, and/or Channel State Information, CSI, feedback of a downlink component carrier or a downlink component carrier group, the plurality of uplink component carriers comprising at least a first uplink component carrier in an unlicensed frequency spectrum and one or more additional uplink component carriers, at least one of which comprises an uplink component carrier in a licensed frequency spectrum, each component carrier of the plurality of uplink component carriers occupying a different frequency range; and
blindly decode HARQ and/or CSI feedback of the downlink component carrier or the downlink component carrier group over at least one of the plurality of uplink component carriers configured for the wireless device for HARQ and/or CSI feedback of the downlink component carrier or the downlink component carrier group.

* * * * *

UNITED STATES PATENT AND TRADEMARK OFFICE
CERTIFICATE OF CORRECTION

PATENT NO.         : 10,063,352 B2
APPLICATION NO.    : 15/006166
DATED              : August 28, 2018
INVENTOR(S)        : Jinhua Liu et al.

Page 1 of 1

It is certified that error appears in the above-identified patent and that said Letters Patent is hereby corrected as shown below:

On the Title Page

In Column 1, above item (51) insert item (30):
-- Foreign Application Priority Data
Jan. 30, 2015 (CN) PCT/CN2015/071932 --

Signed and Sealed this
Sixteenth Day of October, 2018

Andrei Iancu
*Director of the United States Patent and Trademark Office*